Aug. 13, 1968    G. T. NIGRELLI    3,397,014
SAFETY WHEEL FOR AUTOMOTIVE AND SIMILAR VEHICLES
Filed May 3, 1966    3 Sheets-Sheet 3
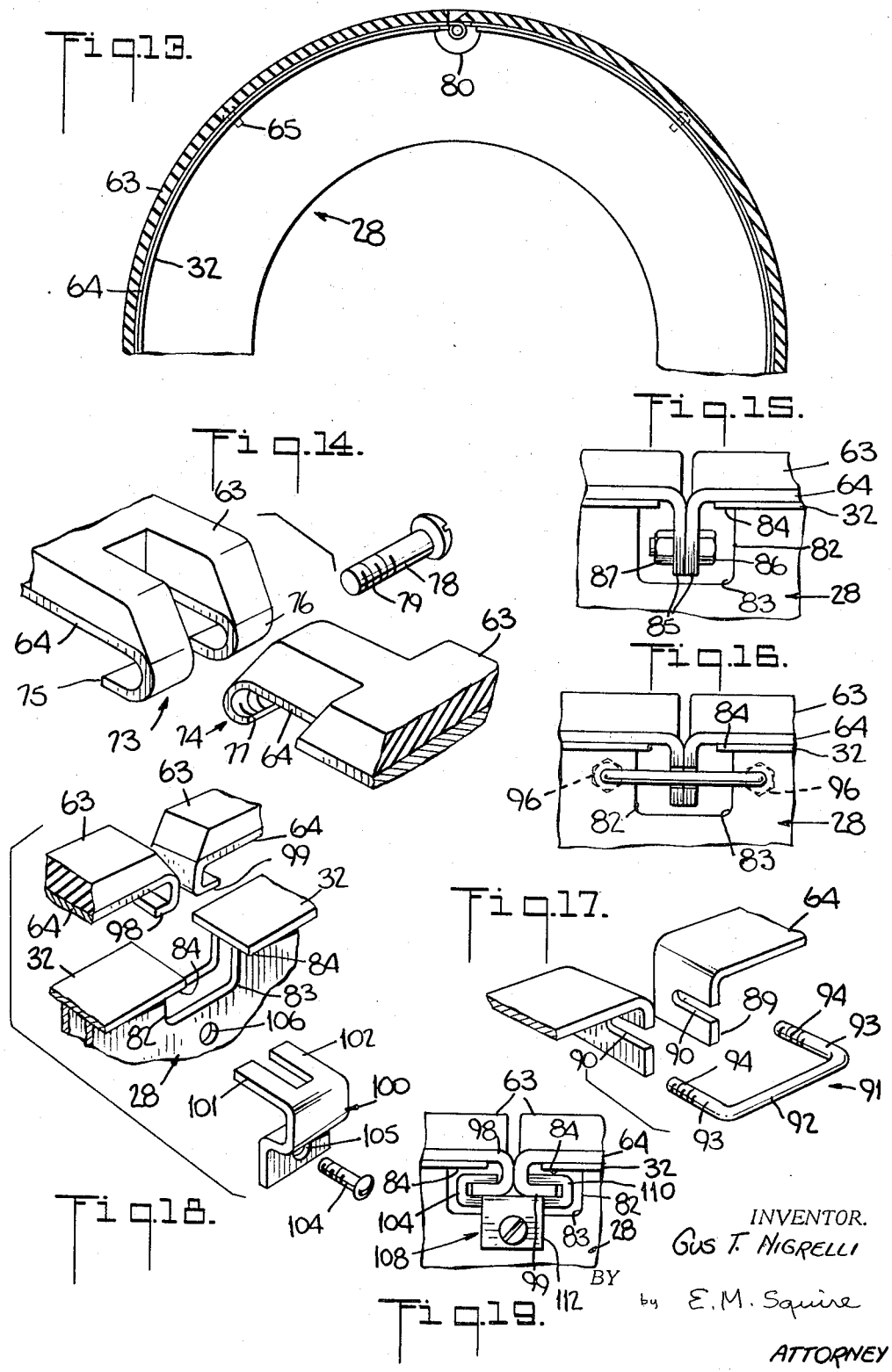
INVENTOR.
Gus T. Nigrelli
BY
E. M. Squire
ATTORNEY United States Patent Office 3,397,014
Patented Aug. 13, 1968

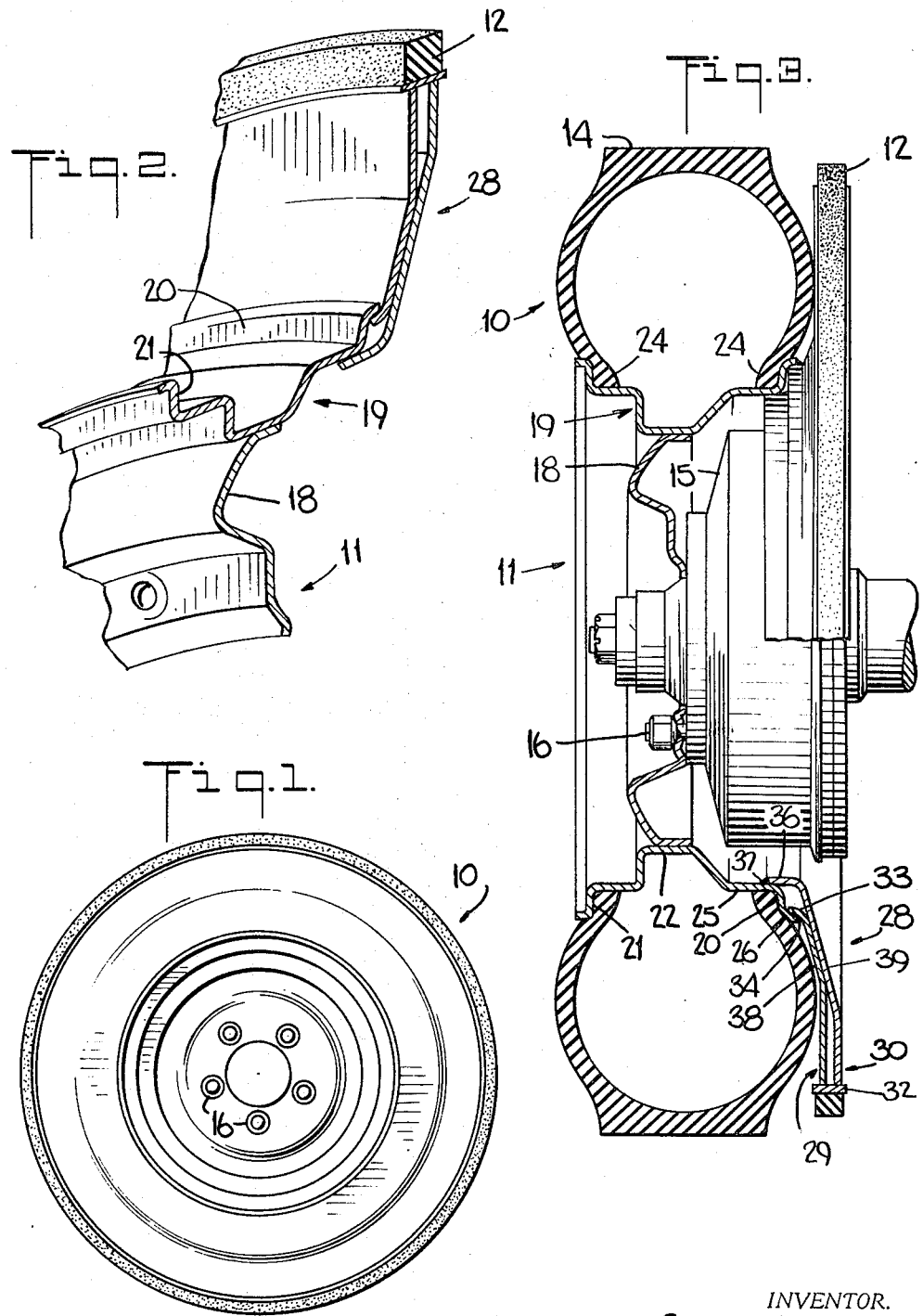

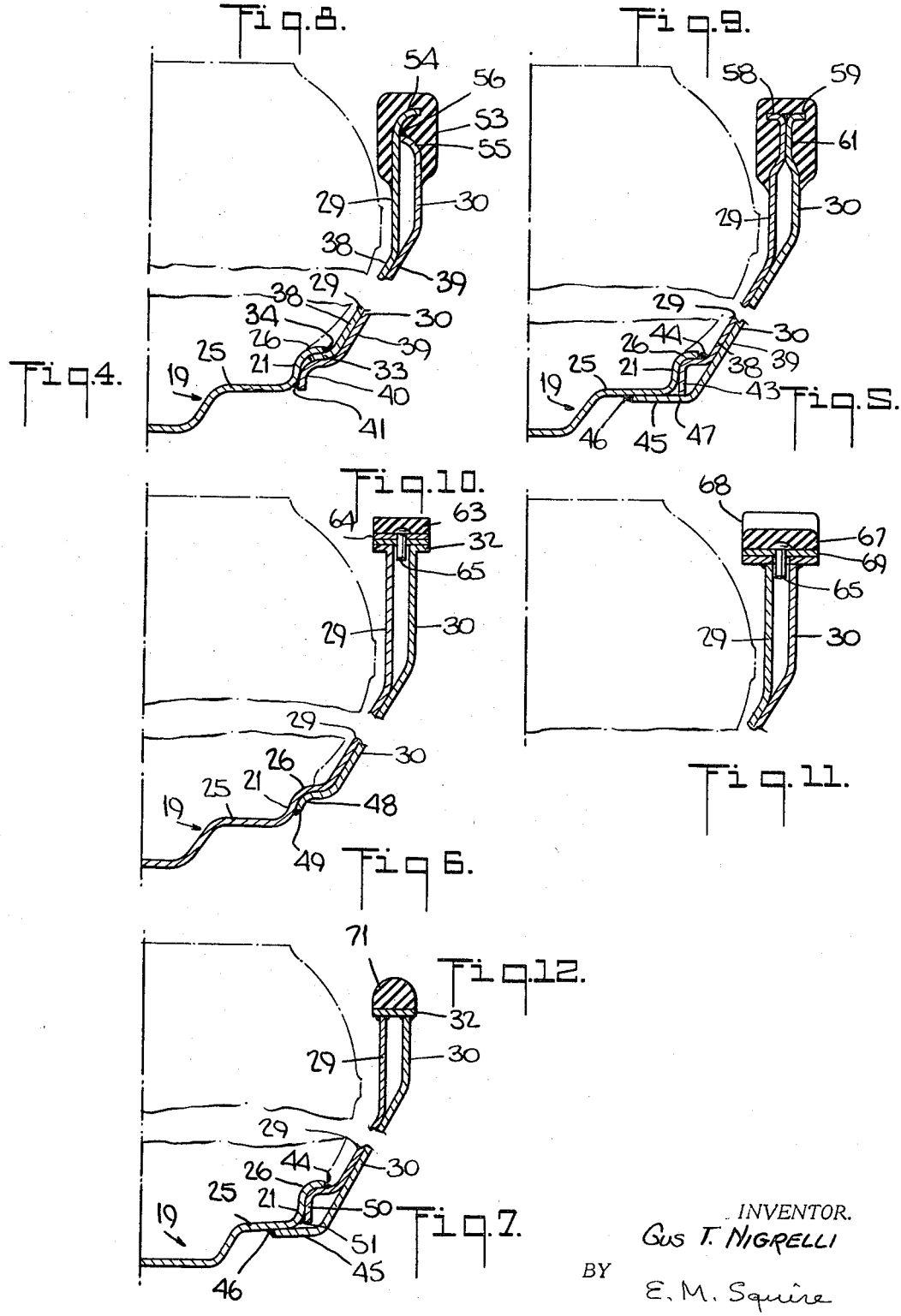

3,397,014
SAFETY WHEEL FOR AUTOMOTIVE AND
SIMILAR VEHICLES
Gus T. Nigrelli, 8871 19th Ave.,
Brooklyn, N.Y. 11214
Filed May 3, 1966, Ser. No. 547,302
15 Claims. (Cl. 301—39)

ABSTRACT OF THE DISCLOSURE

An auxiliary or safety wheel which is associated with a main wheel having a pneumatic tire. Upon failure of the main tire, the tire of the auxiliary wheel takes over the load whereby the need for an emergency tire change is avoided. The auxiliary wheel is permanently secured to the main wheel, and in one embodiment is, in part, integrally formed with the main wheel. The tire of the auxiliary wheel is solid and, in one group of embodiments, is replaceable.

---

The present invention relates to a safety wheel for use with automobiles and similar vehicles using pneumatic tires. More particularly, the invention provides a demountable wheel, a pneumatic tire on the wheel and an auxiliary wheel which is an extension of the main wheel, the auxiliary wheel portion of the main wheel being provided with a solid auxiliary tire. The diameter of the auxiliary tire is less than the diameter of the main tire when fully inflated. In the event of a blowout, the auxiliary tire immediately becomes effective to prevent the vehicle from swerving. Moreover, the auxiliary tire may be used to travel several miles to a service station.

Separate auxiliary wheels are known in the art such as those shown in the patent to Briskman No. 2,234,838 issued on Mar. 11, 1941, and the patent to Cornelissen No. 2,203,774 issued on June 11, 1940. In both of these prior art devices, the auxiliary tire is mounted on a separate wheel member which is mounted on the automobile hub along with the main wheel. This prior art construction involves the mounting of two superposed wheels using the same lug bolts. The present invention provides a unitary wheel including a safety wheel portion integrally formed therewith or permanently secured thereto as by welding. In this manner, a single wheel is mounted by the lug bolts and there is no chance of any false tightening of the lug bolts which might become loose by relative shifting of the two superposed wheels.

The invention will be more clearly understood upon reading the following specification with reference to the accompanying drawing forming a part hereof.

Referring to the drawing:

FIGURE 1 is an elevational view looking at the outer side of a safety wheel in accordance with the invention with a main tire mounted thereon.

FIGURE 2 is a fragmentary perspective view in transverse section taken along a radial plane illustrating a first embodiment of the invention.

FIGURE 3 is an enlarged view in sectional elevation of a complete wheel removably mounted on a hub member of an automobile.

FIGURE 4 is a fragmentary view in radial section illustrating the connection of the auxiliary portion of the wheel to the main wheel.

FIGURE 5 is a view similar to FIG. 4 illustrating a modified construction.

FIGURE 6 is a view similar to FIGS. 4 and 5 showing an auxiliary wheel portion, the inner side of which is integrally formed as an extension of the main wheel.

FIGURE 7 shows still another construction for the connection between the auxiliary wheel portion and the main wheel.

FIGURE 8 is a fragmentary transverse sectional view illustrating an embodiment of the peripheral construction of the auxiliary portion of the main wheel including an auxiliary tire.

FIGURE 9 is a fragmentary transverse sectional view similar to FIG. 8 illustrating a modification.

FIGURE 10 illustrates a further modification wherein the auxiliary tire is removable.

FIGURE 11 is a sectional view showing a removable auxiliary tire which is wider than the tire of FIG. 10 and which is provided with snow cleats, the wider tire being preferable for use with a rear wheel of an automobile.

FIGURE 12 is a further modification of the auxiliary tire.

FIGURE 13 is a fragmentary view in sectional side elevation illustrating a removable auxiliary tire.

FIGURE 14 is an enlarged fragmentary exploded perspective view illustrating the coupling for the removable auxiliary tire shown in FIG. 13.

FIGURE 15 is an enlarged fragmentary view in side elevation showing a further form of coupling.

FIGURE 16 is similar to FIG. 15 illustrating a different form of coupling.

FIGURE 17 is an enlarged fragmentary exploded perspective view showing a portion of the coupling illustrated in FIG. 16.

FIGURE 18 is an enlarged fragmentary exploded perspective view illustrating a bifurcated coupling member.

FIGURE 19 is an enlarged fragmentary view in side elevation showing still another form of coupling.

Referring to FIGS. 1 through 3, a main tire designated generally as 10 is illustratively shown as being of the tubeless type. The tire 10 is mounted on a wheel designated generally as 11. The wheel 10 is also provided at the inner side of the main tire 10 with an auxiliary tire 12. The main tire 10 comprises a road-engaging tread portion 14. The downwardly directed vertical radius of the tread portion 14, when the main tire 10 is inflated and under load, is always greater than the corresponding radius of the auxiliary tire 12 so that, under normal operating conditions, the auxiliary tire 12 never engages the road surface. When the main tire 10 becomes deflated, however, the auxiliary tire 12 immediately becomes operative to carry the load previously carried by the main tire 10.

The wheel 11 is removably secured to a hub member 15 of the vehicle by the usual lug bolts 16. The wheel 11 comprises a central hub-engaging portion 18 and a rim portion designated generally as 19 welded or otherwise permanently secured to the hub-engaging portion 18. The rim portion 19 comprises inner and outer radially extending flanges 20 and 21, respectively, and a dropped center portion 22 within which the beads 24 of the tire 10 are received when the tire is deflated in order to permit removal or mounting of the tire. When the tire 10 is inflated, the beads 24 simultaneously engage the inner and outer flanges 20 and 21 of wheel 10.

The inner flange 20 extends between a horizontal shelf portion 25 and a peripheral lip portion 26 of the rim portion 19 of wheel 11. The auxiliary tire 12 is carried by an auxiliary wheel portion designated generally as 28 of the wheel 11. The auxiliary wheel portion 28 comprises an inner member 29 and an outer member 30. The diameters of the inner and outer members 28 and 29 are equal and, near their peripheries, they are axially spaced and extend radially parallel to each other and perpendicularly with respect to the rotational axis of the wheel 11. The peripheries of the inner and outer members 29 and 30 are interconnected by a circumferential strip 32 which overhangs the inner and outer members 28 and 29. The auxiliary tire 12 is vulcanized directly to the circumferential strip 32.

With the exception of the tires 10 and 12, all of the members hereinabove described are preferably formed of sheet steel. The radially innermost portion 33 of the inner member 29 is inclined inwardly away from the outer member 30 to match the generally frusto-conical inclination of the lip 26 of the rim portion 19. The edge of the lip 26 is permanently secured to the inner member 29 as by a welded connection 34. The inner periphery 36 of outer member 30 is bent to extend axially along the radially inwardly facing side of the horizontal shelf portion 25 of rim 19 and is permanently secured to the shelf portion 25 by a welded connection 37. The welded connections 34 and 37 may be continuous circularly extending connections or they may consist of a series of circularly spaced spot welds, if desired.

Each of the inner and outer members 29 and 30 comprises an intermediate frusto-conical portion 38 and 39, respectively. The frusto-conical portions 38 and 39 are shown in close proximity to each other and may be slightly spaced, may abut each other, as desired. If in abutting relationship, they may be interconnected by any suitable means (not shown) such as a series of spot welds, if desired.

Referring to FIG. 4, the welded connection 34 is provided as described above for FIG. 3. The outer intermediate portion 39 extends in close proximity to the inner peripheral portion 33 and its radially innermost portion 40 abuts the outer flange 21 being secured to the rim portion 19 at the junction between the shelf portion 25 and flange 21 by a welded connection 41.

FIGURE 5 illustrates a modification of FIG. 4, whereing the radially innermost portion 43 of inner member 29 is shaped to conform to the configuration of flange 21 and lip 26. The inner member 29 is connected to the edge of the lip 26 by a welded connection 44. The radially innermost portion 45 of outer member 30 extends along the shelf portion 25 and is permanently secured thereto by a welded connection 46. The terminal edge 47 of innermost portion 43 abuts the innermost portion 45 of outer member 30 perpendicular with respect thereto.

FIGURE 6 shows the inner member 29 integrally formed as an extension of rim portion 19 of the wheel 11 providing a one-piece construction. There is no need for a welded connection. The radially innermost portion 48 of outer member 30 extends along lip 26 and flange 21 being permanently secured to the rim portion 19 adjacent to the junction between flange 21 and shelf portion 25 by a welded connection 49.

FIGURE 7 is similar to FIGURE 9, except that the radially innermost portion 50 of inner member 29 is permanently secured to the rim 19 by a welded connection 51 in addition to the welded connections 44 and 46 as also shown in FIG. 5. The additional welded connection 51 is located adjacent to the junction between flange 21 and the shelf portion 25 as in the case of the welded connection 41 shown in FIG. 4.

FIGURE 8 shows a modified form of auxiliary tire 53 which may be used instead of the auxiliary tire 12 described above. The peripheral portions 54 and 55 of the inner member 29 and outer member 30, respectively, are oppositely turned. The peripheral portion 54 of inner member 29 axially overhangs the peripheral portion 55 of the inner member 29. The peripheral portion 55 abuts the inner member 29 near its periphery and is permanently secured thereto by a welded connection 56. The tire 53 is vulcanized directly to the peripheral portions 54 and 55 as in the case of the auxiliary tire 12 described above. The arrangement of FIG. 8 may be secured to the wheel 11 as shown in any of FIGS. 2 through 7.

FIGURE 9 illustrates a modified form of construction for the auxiliary wheel portion wherein the inner and outer members 29 and 30 have their peripheral edges 58 and 59 axially directed in opposite directions, the inner and outer members 29 and 30 being closely adjacent to each other immediately radially inwardly of the edges 58 and 59. The axially directed edges 58 and 59 are connected together at their proximate ends by a welded connection 60. A solid tire 61 is vulcanized directly to the inner and outer members 29 and 30 with the edges 58 and 59 permanently embedded in the tire.

FIGURE 10 shows a modification wherein the solid tire 63 is permanently vulcanized directly to an additional circumferential strip 64. The circumferential strip 32 described above in connection with FIGS. 1–3 has apertures formed therein to receive a series of circumferentially spaced guide pins 65 fixed to the strip 64. The guide pins 65 are slidable in the apertures to permit removal and replacement of the tire 63 along with the additional strip 64. The additional circumferential strip 64 has free ends which are releasably connected together as described in greater detail below in connection with FIGS. 13–19.

FIGURE 11 illustrates a solid tire 67 provided with snow cleats 68. The tire 67 is permanently secured to a additional circumferential strip 69 –by direct vulcanization thereto. Guide pins 65 are provided as in FIG. 10. The tire 68 and strip 69 are wider than the tire 63 and strip 64 of FIG. 10, the arrangement of FIG. 11 being preferable for a rear wheel of an automobile where a greater space is available for the auxiliary tire than in the case of a front wheel.

FIGURE 12 shows a tire 71 of semi-circular cross-sectional configuration directly vulcanized to a circumferential strip 32. The strip 32 is supported as described above in connection with FIGS. 1–3.

Referring to FIGS. 13 and 14, an auxiliary tire 63 is shown vulcanized to an additional circumferential strip 64, as previously described in connection with FIG. 10. The additional circumferential strip 64 is provided with interconnectable end portions 73 and 74. The end portion 73 is shaped to provide two laterally spaced hooks 75 and 76 and the other end portion 74 is shaped to provide a single hook 77 which fits between the laterally spaced hooks 75 and 76 of end portion 73. The single hook 77 is interiorly threaded for engagement with a bolt 78. The threads 79 of the bolt 78 engage the threads of the hook 77 whereby the ends 73 and 74 of strip 64 may be disengageably interconnected. A nut (not shown) may be applied to the threads 79 of bolt 78, if desired. The interconnected hooks 75, 76, 77 of strip 64 are received in a notch 80 formed in the periphery of the auxiliary wheel portion 28 of wheel 11.

The weight of the metal which is removed by the formation of the notch 80 may be balanced by suitably dimensioning the compensating weight of the bolt 78 and hooks 75, 76, 77 so that the complete wheel is properly balanced.

Referring to FIG. 15, the notch 82 is of generally rectangular configuration with rounded radially inwardly located corners 83. The ends of the circumferential strip 32 overhang the sides of the notch 82 as indicated at 84. The ends 85 of the additional circumferential strip 64 are radially inwardly directed into the notch 82. The ends 85 have circumferentially aligned holes (not visible in the drawing) formed therein and are connected together by a hexagonally headed bolt 86 and nut 87. As previously stated, the wheel may be balanced by suitably dimensioning the weights of the ends 85, bolt 86 and nut 87 with respect to weight of the material which was removed by the formation of the notch 82.

FIGURES 16 and 17 show a form of coupling wherein the ends 89 of the additional circumferential strip 64 are radially inwardly directed and have axially extending notches 90 formed therein.

A U-shaped retaining member designated generally as 90 is of circular cross-section and comprises a circumferentially extending guide portion 92. The guide portion 92 extends between spaced parallel leg portions which have threads 94 formed on the ends thereof. The guide portion 92 is received in the notches 90 and the leg portions 93 extend through holes formed in auxiliary wheel portion 28 of wheel 11 so that the threads 94 extend therebeyond. Nuts 96 are secured on the threads 94 and hold the retaining member 91 securely fixed in the auxiliary wheel portion 28 so that the guide portion 92 extends across the notch 82. The ends 89 are held against radial outward movement by engagement of the guide portion 92 in the notches 90. The additional circumferential band 64 is thus held against outward movement while a limited amount of circumferential movement of the ends 89 is permitted.

FIGURE 18 illustrates a further modification of the coupling arrangement. The ends of the additional circumferential strip 64 are reversely turned to form hooks 98 and 99. A bifurcated coupling member 100 has spaced parallel legs 101 and 102. The leg 101 is received in hook 98 and the leg 102 is received in hook 99 with the hooks 98 and 99 positioned in the notch 82. The coupling member is secured to the auxiliary wheel portion 28 by a screw 104 which passes freely through a hole 105 in coupling member 100 and is received in a tapped hole 106 in auxiliary wheel portion 28.

FIGURE 19 shows a coupling member comprising oppositely directed hooks 109 and 110 which engage the hooks 98 and 99, respectively, of the additional circumferential strip 64. The hooks 109 and 110 are integrally formed with a radially inwardly extending tab 112 which is secured to the auxiliary wheel portion by a screw 113.

While I have shown and described what I believe to be the best embodiment of my invention, it will be apparent to those skilled in the art that various changes and modifications may be made therein without departing from the spirit and scope of the invention as defined in the appended claims.

What is claimed is:

1. A vehicle wheel comprising: a hub portion for mounting said wheel on a vehicle; a main rim portion for mounting a main pneumatic tire on said wheel; an auxiliary wheel portion permanently secured to said rim portion at the axially inner side of said main tire, said auxiliary wheel portion compirsing an axially inner member which forms an extension of said main rim portion and an outer member, said inner and outer members extending radially outwardly from said main rim portion in contact with each other and obliquely with respect to the rotational axis of said wheeel to a region intermediate said main rim portion and the periphery of said auxiliary wheel, said inner and outer members extending from said region radially outwardly toward said periphery in axially spaced substantially parallel relationship; an auxiliary wheel rim portion which interconnects said inner and outer members at their outer peripheral portions; and an auxiliary tire mounted on said auxiliary rim portion, the downwardly directed vertical radius of said auxiliary tire, when said main tire is inflated and under load, being less than the corresponding radius of said main tire, said auxiliary tire supporting said load upon deflation of said main tire and being held positioned to support said load jointly by said inner and outer members of said auxiliary wheel portion.

2. A wheel according to claim 1, wherein one of said inner and outer members is an integrally formed extension of said rim portion.

3. A wheel according to claim 1, wherein the peripheral edges of said inner and outer members are axially directed and in which said auxiliary tire is a solid tire, at least one of said edges being permanently embedded in said solid tire.

4. A wheel according to claim 1, wherein the peripherally innermost portion of said outer auxiliary wheel member is connected to said rim portion.

5. A wheel according to claim 1, wherein the peripheral edges of said inner and outer members are of equal diameters, and in which said auxiliary rim portion comprises a circumferential strip permanently interconnecting said members at said edges, said auxiliary tire being supported by said strip.

6. A wheel according to claim 5, wherein said tire is a solid tire permanently connected to said strip.

7. A wheel according to claim 6, wherein said solid tire is generally semicircular in transverse cross-sectional configuration.

8. A wheel according to claim 5, wherein said auxiliary wheel portion further comprises an additional circuferential strip removably connected to and surrounding said first-named strip, said auxiliary tire being a solid tire permanently connected to said additional strip.

9. A wheel according to claim 8, wherein said members and said first-named strip have a peripherally opening recess formed therein and in which said additional strip comprises two free end portions, said auxiliary wheel portion further comprising releasable coupling means located in said recess and interconnecting said free end portions.

10. A wheel according to claim 9, wherein said free end portions of said additional strip are hook-shaped and in which said coupling means engages in said end portions.

11. A wheel according to claim 10, wherein said hook-shaped end portions extend past each other to define an axially extending passageway, and in which said coupling means comprises a bolt member received in said passageway.

12. A wheel according to claim 10, wherein said hook-shaped end portions are circumferentially spaced and in which said coupling means comprises a bifurcated member having axially extending leg portions simultaneously received in said end portions.

13. A wheel according to claim 10, wherein said hook-shaped end portions are circumferentially spaced and in which said coupling means comprises hook-shaped portions engaged in and directed oppositely to said end portions.

14. A wheel according to claim 9, wherein said free end portions are directed radially inwardly into said recess, and in which said coupling means comprises nut and bolt means.

15. A wheel according to claim 14, wherein said free end portions extend radially inwardly into said recess and have open-ended slots formed therein, and in which said coupling means comprises a circumferentially extending portion received in said slots and holding said end portions against radial movement.

References Cited

UNITED STATES PATENTS

| | | | |
|---|---|---|---|
| 1,992,079 | 2/1935 | Ludwick | 301—39 |
| 2,110,929 | 3/1938 | Palma | 301—39 |
| 2,447,428 | 8/1948 | O'Leary | 301—38 |
| 2,502,060 | 3/1950 | O'Dea | 301—38 |
| 2,682,431 | 6/1954 | Douberg | 301—39 |

FOREIGN PATENTS

| | | |
|---|---|---|
| 865,559 | 3/1941 | France. |
| 435,086 | 9/1935 | Great Britain. |

RICHARD J. JOHNSON, *Primary Examiner.*